Figure 1:
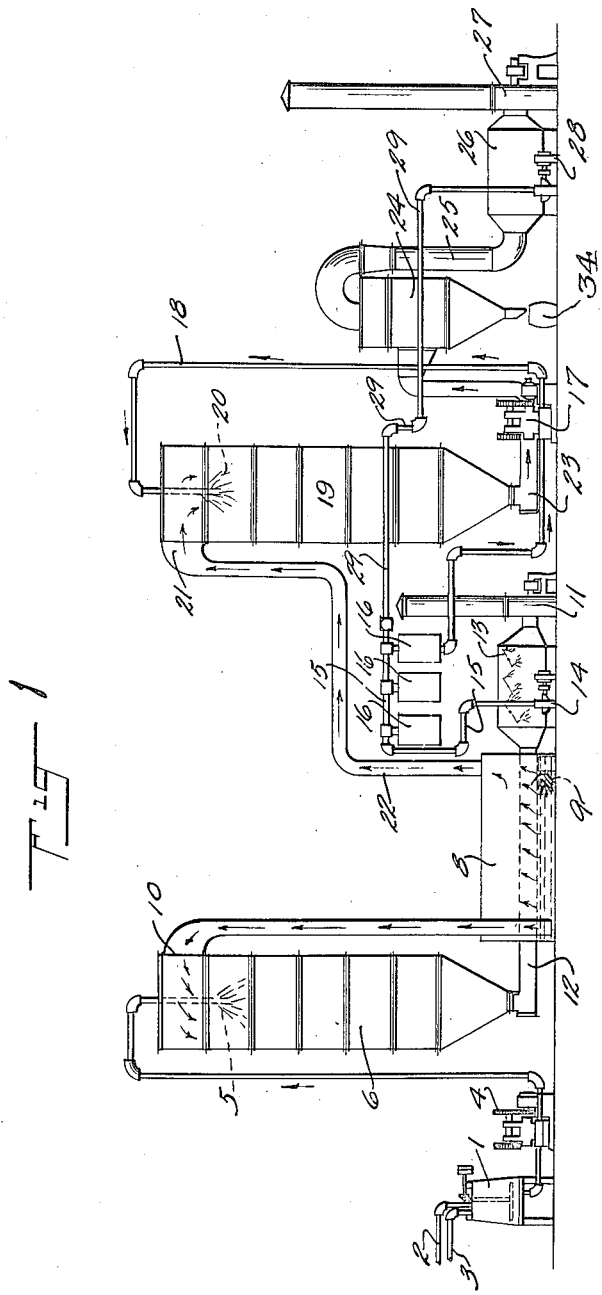

Nov. 20, 1923.

E. E. DOUGHERTY

PROCESS FOR THE MANUFACTURE OF LITHOPONE

Filed Nov. 29, 1922

1,474,766

INVENTOR
Elmer Ellsworth Dougherty
BY
ATTORNEY

Patented Nov. 20, 1923.

1,474,766

UNITED STATES PATENT OFFICE.

ELMER ELLSWORTH DOUGHERTY, OF GLEN RIDGE, NEW JERSEY, ASSIGNOR TO LUCIS TRUST, A CORPORATION OF NEW JERSEY, OF RIDGEFIELD PARK, NEW JERSEY.

PROCESS FOR THE MANUFACTURE OF LITHOPONE.

Application filed November 29, 1922. Serial No. 604,013.

*To all whom it may concern:*

Be it known that I, ELMER ELLSWORTH DOUGHERTY, citizen of the United States, and resident of Glen Ridge, in the county of Essex and State of New Jersey, have invented certain new and useful Improvements in Processes for the Manufacture of Lithopone, of which the following is a specification.

My invention relates to processes for the manufacture of lithopone and more especially to those processes that include a mixture of zinc sulphate and barium sulphide and has for its object to produce a simple practical process with minimum number of operations that will be continuous in its execution.

A further object is the production of a process in which the green cake particles are held in suspension and in motion all through the calcining, dehydrating, washing operation, etc.

The foregoing and other features of my invention will now be described in connection with the accompanying drawing forming part of this specification in which I have diagrammatically shown the various apparatus which I employ connected up in one of a number of ways that may be employed to carry out my process, after which I shall point out in the claims those features which I believe to be new and of my own invention.

In the drawing reading from left to right, I have arranged the apparatus as follows: paddle tank 1, pump 4, dehydrator 6, calcining furnace 8, quencher 13, pump 14, fan 11, dehydrator 19, pump 17, collector 24, pump 28, scrubber 26, fan 27.

Zinc sulphate solution that has been properly purified is mixed in proper portions with a solution of barium sulphides that is free of suspended matter. A double precipitation of zinc sulphide and barium sulphate takes place according to formula.

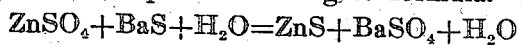

$$ZnSO_4 + BaS + H_2O = ZnS + BaSO_4 + H_2O$$

The product of the above reaction, being a double precipitate is necessarily a very intimate mixture of two insoluble substances in a more finely divided state than could have been produced by mechanical means, but it has the disadvantage that not only is it hard to filter, but the filter cake formed retains a large proportion of water.

In the carrying out of my process, I provide a paddle tank 1 into which is fed a regulable amount of barium sulphide and zinc sulphate through the pipes 2 and 3 respectively.

The crude slurry in tank 1 is then transferred by means of the triplex pump 4, as a fine spray at 5 into the top of the dehydrating tower 6. The dehydrating medium may be flue-gas from calciner 8 which is heated by an oil burner 9, and enters at the top of tower 6 at 10 above the spray at 5. The finely divided, dry, crude lithopone in suspension in the moisture-laden air, is aspirated by means of the fan 11 to the bottom of the tower, thence through duct 12 into calciner 8, and thence, after each fine particle has been properly heated, to quencher 13. Circulation of the dehydrating-air as it enters the top of tower 6, and later, the finely divided, suspended, dried lithophone, and moisture-laden air passing through the tower (from top to bottom), through duct 12, thence to calciner 8, and finally the quencher 13 is kept up by the fan 11, from which in turn the cooled residual gases, freed from solids, eventually escape.

The thin slurry of finished lithopone is then transferred from quencher 13 by means of the centrifugal pump 14, through pipe-line 15, into tanks 16, where it is washed, or treated in any manner found necessary or desirable. After washing, the lithopone slurry is now run from tanks 16, and by means of triplex pump 17 is forced through pipe-line 18 to the top and into a second dehydrating tower 19 as a spray 20, where it is instantly dried by the hot air 21 from the calciner 8, passing through the duct 22.

The product of this tower is a finely divided finished lithopone suitable for market, but it is suspended like a dust in the hot moisture laden air, from which it is separated as follows:

The lithopone and moisture-laden hot air are aspirated to bottom of tower 19, thence through duct 23, and into collector 24. The finished lithopone may be then discharged into barrels 34 and the residual air passes though duct 25 into scrubber 26, and is finally discharged at exit of fan 27 in a cooled state and free from suspended matter.

The lithopone recovered in scrubber 26 is transferred by means of centrifugal pump 28 through pipe-line 29 back into washing tanks 16, where it is mixed with subsequent batches from quencher 13. The fan 27 at the end of the system causes the circulation of both solids and vapor from hot air flue 22 through the various intermediate apparatus to the final exit.

My process is operated as follows:

The slurry of crude lithopone, as made in the mixing tank 1 is sprayed in to the top of a drying tower, where it comes into contact with hot dry air, which also enters the top of tower. Dehydration of the spray is instantaneous, with the production of an impalpable powder held in suspension in a moisture laden air and at a temperature high enough to prevent the condensation of the moisture. This mixture of finely divided dust-like lithopone in the hot moisture laden air is now aspirated by means of a fan placed at the end of the system as follows:

First it passes through the calcining tube-like furnace, where it is heated gradually, losing first the combined water, then sulphur and finally reaching the hottest zone, from whence it is immediately aspirated into quencher, where it comes into contact with a water spray. If the temperature of the calciner and the circulation speed are kept constant, a uniform product will be obtained, as the lithopone being finely divided, and each particle having the same size, will, when kept in suspension and circulating at the same speed through the various zones of the furnace, take up the same amount of heat before quenching. Any degree of temperature for the discharged lithopone found desirable may be obtained at will, and the temperature and speed of circulation may be so controlled that each fine particle may be heated to incandescence before quenching if found advisable.

The hottest part of the calciner is adjacent to the quencher, which may be of the scrubber type. The cooled, washed air then escapes at the fan outlet.

The finished lithopone in the quencher is transferred to tanks where it is washed and treated as desired, in the same manner as in the regular process. After washing or otherwise treating, the lithopone slurry is fed as a spray into the top of a second dehydrating tower 19 of the same design as the first, with both spray and hot dry air entering at the top. Circulation is induced by fan at the very end of the system. After dehydration in the tower, the finished lithopone, in a finely divided state, and in suspension in the hot moisture laden air is then aspirated through a dust-collector 24, where a separation of solids and air takes place. The solid matter which is equivalent to bolted, finished lithopone is discharged into barrels 34, and the residual air after passing through a scrubber passes out of the system at the fan outlet. The lithopone recovered in this scrubber is from time to time transferred to washing tanks.

Orinarily, the waste heat from calcining furnace will be more than sufficient to operate both spray dryers. If for any reason it is found otherwise, a small auxiliary oil burning furnace could be added, or indirect heat from barium reduction furnace flue could be utilized.

One of the features of this process that is readily apparent from reading the above detailed description is the elimination of many operations with its consequent effect upon space and equipment and cost of equipment, power and labor. To more fully emphasize this, I submit a flow sheet showing a parallel of the standard process and my process.

*Flow sheet showing old and new processes.*

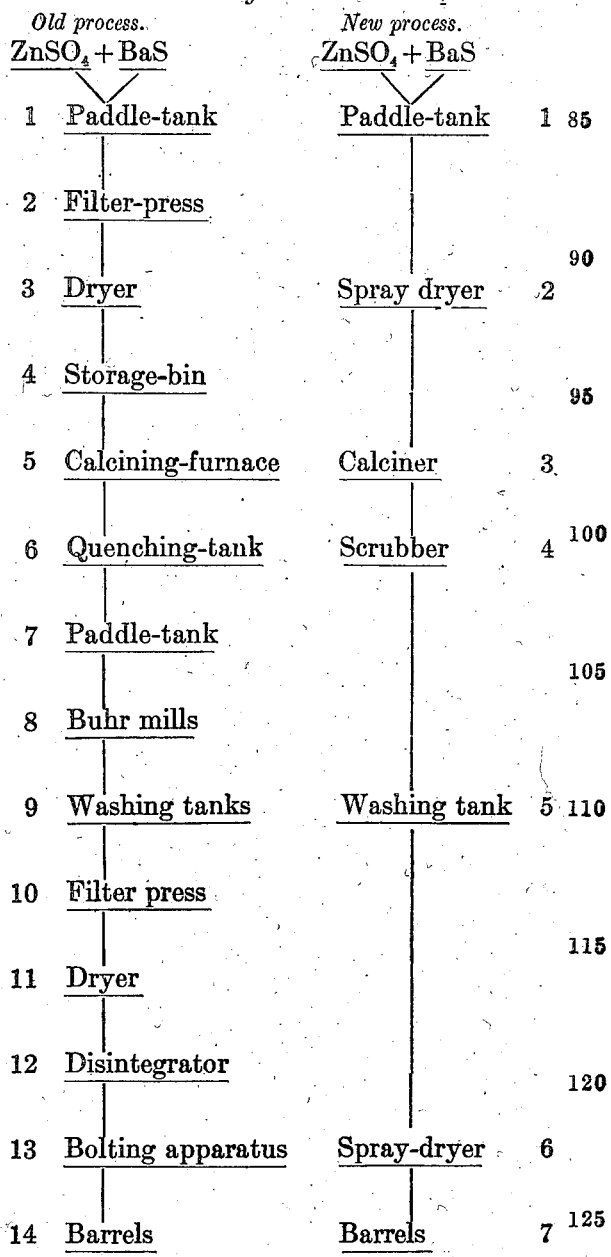

| Old process. | | New process. | |
|---|---|---|---|
| $ZnSO_4 + BaS$ | | $ZnSO_4 + BaS$ | |
| 1 | Paddle-tank | Paddle-tank | 1 |
| 2 | Filter-press | | |
| 3 | Dryer | Spray dryer | 2 |
| 4 | Storage-bin | | |
| 5 | Calcining-furnace | Calciner | 3 |
| 6 | Quenching-tank | Scrubber | 4 |
| 7 | Paddle-tank | | |
| 8 | Buhr mills | | |
| 9 | Washing tanks | Washing tank | 5 |
| 10 | Filter press | | |
| 11 | Dryer | | |
| 12 | Disintegrator | | |
| 13 | Bolting apparatus | Spray-dryer | 6 |
| 14 | Barrels | Barrels | 7 |

It is further obvious that by virtue of the continuity of the process, and the further fact that all the operations may be conducted in closed apparatus in which the finely divided particles are left in suspension and in motion, instantaneous reactions take place which will insure a uniform product as to color, fineness and other necessary qualifications.

It will also be observed that the crude lithopone is calcined as a dust when not only in suspension but also in motion. With the arrangement shown the heating is gradual as the particles pass from the coolest zone to the hottest zone, in the calciner 8, and as soon as it has attained the highest temperature necessary, it is immediately removed and quenched, thereby preventing overheating.

Utilization of combustion gases, and hot air from calciner cuts down fuel consumption, and power is otherwise conserved through the elimination of heavy machinery.

Although lithopone is mentioned specifically, this process could be used just as advantageously for other pigments such as mixtures of zinc and other metal oxides or other insoluble combinations, with barium or calcium sulphate, carbonate, etc., where the above operations are followed, fully or in part.

Having thus fully described my invention, what I claim and desire to secure by Letters Patent is:

1. The process for producing lithopone which includes the mixing of $ZnSO_4$ and BaS in proper portions in a paddle tank, spray drying and heating the particles in suspension and in motion gradually, exposing to cold water spray, washing, and spray drying.

2. The process recited in claim 1 with the addition of bringing the heated particles up to incandescence.

3. The process for producing lithopone which includes the spray drying of a mixture of zinc sulphide and barium sulphate in the presence of hot air, aspirated through a calcining furnace, cooled by water spray and dehydrated.

4. The process for producing lithopone which includes the mixing of $ZnSO_4$ and BaS in proper portions in a paddle tank, spray drying the slurry, heating the particles to incandescence, washing with cold water spray, and spray drying.

5. The process recited in claim 4 with the addition of conducting the process in a closed apparatus.

6. The process for producing lithopone which includes the spray drying of the mixture of ZnS and $BaSO_4$ and calcining the crude lithopone as a dust, in suspension and in motion.

7. The process recited in claim 6 with the addition of exposing the crude lithopone to gradually increasing heat until the dust becomes incandescent.

8. The process recited in claim 6 with the addition of heating to incandescence and quenching with cold water.

9. The process for producing lithopone which includes the mixing solutions of $ZnSO_4$ and BaS, reducing the slurry to a finely divided state, dehydrating and treating the particles in suspension and in motion to gradually increasing temperature, quenching with cold water, and spray drying.

10. The process for producing lithopone which includes the step of carrying out reactions while the particles are in suspension and in motion.

Signed at 135 Broadway, New York city, in the county of New York and State of New York.

ELMER ELLSWORTH DOUGHERTY.

Witness:
M. J. VALENTINE.